(12) United States Patent
Balle et al.

(10) Patent No.: US 7,236,287 B2
(45) Date of Patent: Jun. 26, 2007

(54) POCKELS CELL

(75) Inventors: Stefan Balle, Germering (DE); Sven Poggel, Groebenzell (DE); Thomas Fehn, Kronach (DE)

(73) Assignee: LINOS Photonics GmbH & Co. KG, Goettingen (DE)

( * ) Notice: Subject to any disclaimer, the term of this patent is extended or adjusted under 35 U.S.C. 154(b) by 0 days.

(21) Appl. No.: 10/523,282

(22) PCT Filed: Dec. 18, 2003

(86) PCT No.: PCT/EP03/14462

§ 371 (c)(1),
(2), (4) Date: Nov. 28, 2005

(87) PCT Pub. No.: WO2004/057412

PCT Pub. Date: Jul. 8, 2004

(65) Prior Publication Data

US 2006/0187521 A1 Aug. 24, 2006

(30) Foreign Application Priority Data

Dec. 19, 2002 (DE) .............................. 102 59 770

(51) Int. Cl.
*G02B 1/07* (2006.01)
(52) U.S. Cl. ........................ 359/257; 359/245; 359/238
(58) Field of Classification Search ................ 359/257, 359/237, 238, 240, 245, 247, 251, 252
See application file for complete search history.

(56) References Cited

U.S. PATENT DOCUMENTS 3,659,917 A   5/1972   Boutineau .................... 359/245
4,301,362 A   11/1981  Mourou ................... 250/214 R
4,379,620 A   4/1983   Erickson ..................... 359/249
4,998,803 A   3/1991   Salour et al. ............... 359/896

OTHER PUBLICATIONS

Sep. 15, 1990 Multikilowatt Pockels cell for high average power laser systems L.F. Weaver et al. Journal of Applied Physics pp. 2589-2598.
Feb. 13, 2000 RTP as a Q-switch for high repetition rate applications E. Lebiush et al. Electro-Optics Division, Soreq NRC, Yavne 81800, Israel, . . . pp. 63-65.
1986 Cooled Pockels cell for laser fusion applications G.M. McWright, Lawrence Livermore National Laboratory Optical and Quantum Electronics 18 (1986)—Short Communication vol. 18, pp. 89-91.

*Primary Examiner*—Timothy Thompson
(74) *Attorney, Agent, or Firm*—Jordan and Hamburg LLP

(57) ABSTRACT

The invention relates to a pockels cell comprising two spaced-apart cubical RTP crystals that have a square cross section, are located one behind another, and are oriented towards each other so as to provide thermal compensation in the direction of radiation. Each of said RTP crystals is provided with electrodes on two opposite faces, said faces of one crystal being rotated by 90° relative to the faces of the other crystal and relative to the direction of radiation (5). Flexible, electrically insulating, high voltage-proof plastic mats which conduct heat well and rest against the inside of a cooling member are provided around the exterior faces of the electrodes.

20 Claims, 3 Drawing Sheets

POCKELS CELL

The invention relates to a Pockels cell with two successive preferably identical parallelepiped RTP crystals that are oriented in the direction of radiation for thermal compensation to one another, that are arranged spaced from one another, and that have a rectangular cross-section, of which each is provided with electrodes on two opposing surfaces, whereby these surfaces of the one crystal are rotated by 90° to those of the other crystal with respect to the direction of radiation.

Such Pockels cells acting as electronically switches are known in and of themselves. The optical successive arrangement is necessary in order to eliminate the temperature-dependent effect of the double refraction and is known in and of itself. When voltage is applied to the electrodes, the electrolytically induced phase displacements are summed, and during the half wave voltage the direction of polarization at the output of the crystal arrangement is rotated 90° relative to the direction at the input, which effects the desired—optical—switching effect.

However, in these known Pockels cells it is disadvantageous that the thermal compensation only functions when the preferably identical crystals have exactly the same length. Once the crystals absorb a portion of the laser radiation that falls in the direction of radiation, the laser radiation is converted locally to heat energy and leads to an increase in the temperature, which can lead to a situation in which due to a different thermal expansion the crystals are not the same length, which is undesirable. In addition, differences in the design index, caused by temperature differences, along the direction of radiation in the crystals have a negative effect on the compensation effect.

The object of the invention is therefore to further develop a generic Pockels cell such that the thermal compensation is maintained despite the laser radiation being partially absorbed by the crystal.

This object is inventively attained in a generic Pockels cell in that the exterior sides of the electrodes are provided with flexible, electrically insulating, high voltage-proof plastic or rubber mats that conduct heat well and in that these are adjacent to the interior side of a cooling body.

With this embodiment it is possible to carry off in the most uniform manner possible heat occurring in the crystal, this also mechanically distorting the electrodes only minimally so that as a whole both crystals have the same length despite the heat occurring in them and a most uniform possible temperature distribution occurs in them, without the electrodes mechanically distorting the crystal at the same time. The result is thus the highest degree of precise thermal compensation of the Pockels cell by the inventively provided cooling, whereby these are provided homogeneously across each of the total of four surfaces of the two crystals provided with electrodes and are symmetrical with respect to the two electrode surfaces of each crystal. At the same time, the crystals, which are also mechanically held by means of the electrodes, are held with low distortion due to the use of the flexible plastic mats. Crystals other than RTP crystals can also be used if these also require compensation due to the temperature-dependent effect of double refraction. Likewise, the successive arrangement of four crystals is inventively possible.

When in a further design the embodiment of the cooling body and the arrangement of the crystals for this are selected to be symmetrical, the result is further homogeneous cooling across the electrode surface pairs of the adjacent crystals.

This cooling is inventively enhanced in that the cooling bodies comprise copper and have cooling channels arranged running in the direction of radiation and symmetrical to one another.

It is particularly advantageous when a coolant flows anti parallel through adjacent cooling channels, which also results in homogeneous distribution of the temperature.

This effect can be further amplified in that electrodes formed from an angle section of an electrical conductor are embodied symmetrically. Each of the two electrodes comprises two parts that are point-symmetrical with respect to a point of symmetry and that are rotated 90° relative to one another about the axis of symmetry running parallel to the direction of radiation through the point of symmetry, whereby the one electrode can be embodied in parts in order to keep thermal stress to a minimum.

One skilled in the art will furthermore understand that the electrical connector for the two electrodes is insulated by each half-shell of the cooling body and passes through parallel to its separation surface, continuing the principle of symmetry and rendering beneficial uniform temperature distribution/cooling of the crystals.

One preferred exemplary embodiment of the invention is described in greater detail in the following with reference to the drawings.

Figure 1A:
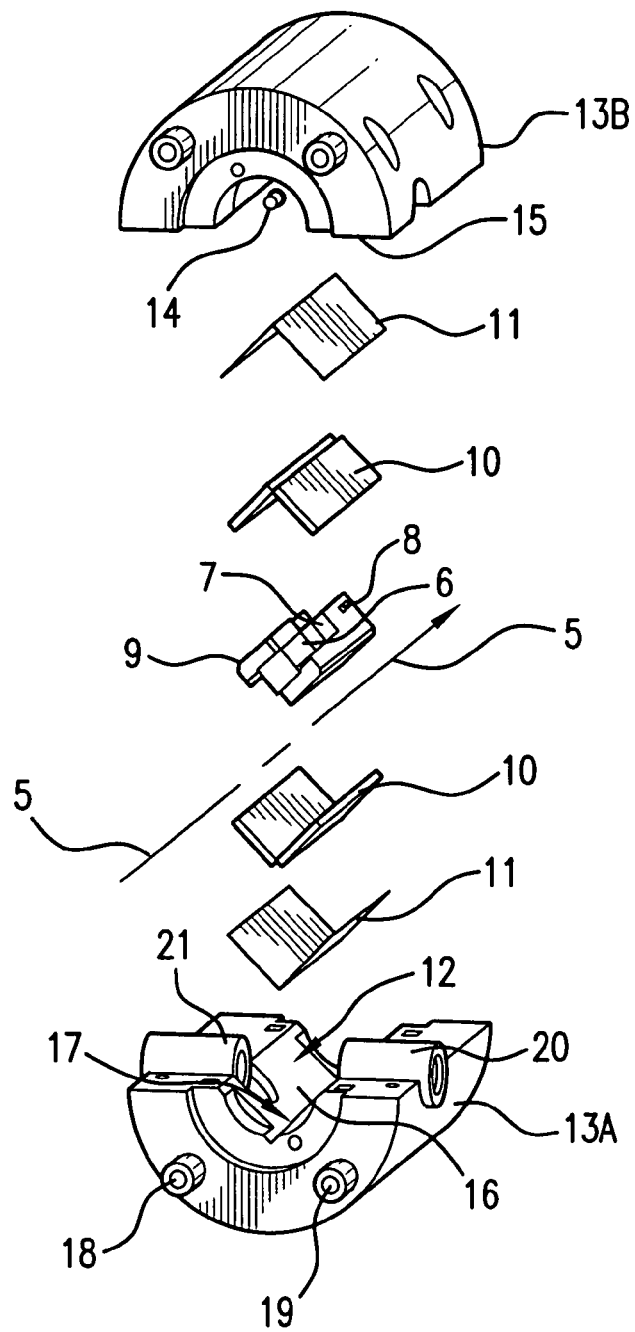
FIG. 1a illustrates the Pockels cell with cooling body and electrodes in an exploded drawing.

In FIG. 1a, the Pockels cell is illustrated in an exploded drawing. Provided are two RTP parallelepiped crystals 6, 7 that are arranged successively in the direction of radiation 5 and spaced from one another and that have a rectangular cross-section, of which each is provided at two surfaces opposing one another with electrodes 8, 9 made of metal, whereby the surfaces of the one crystal are rotated by 90° to those of the other crystal with respect to the direction of radiation 5. The electrodes are attached to the opposing surfaces of the crystal e.g. using an adhesive.

Figure 1B:
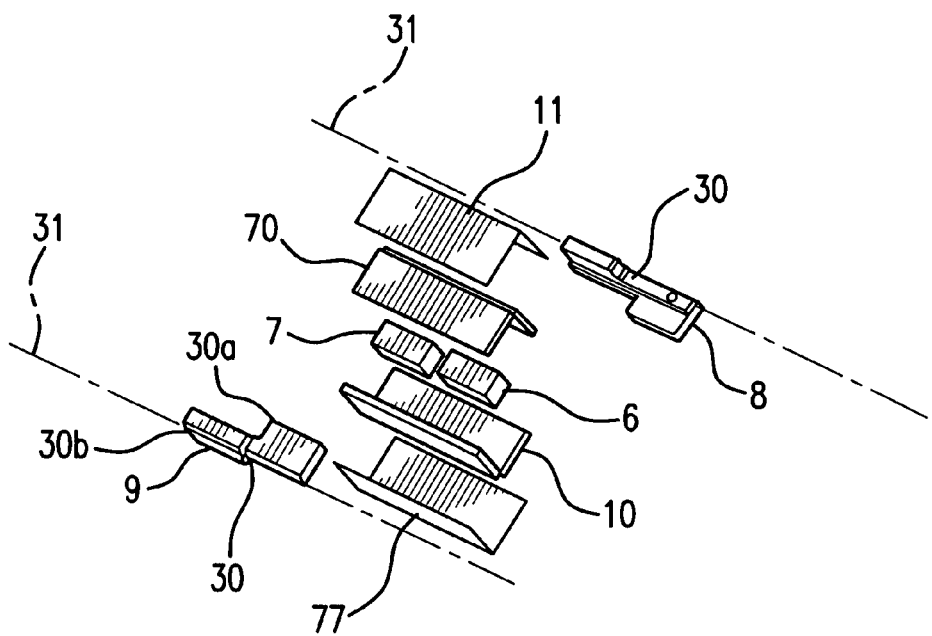
FIG. 1b illustrates a detail of the Pockels cell in accordance with FIG. 1 and in an exploded drawing from another perspective.
Figure 2:
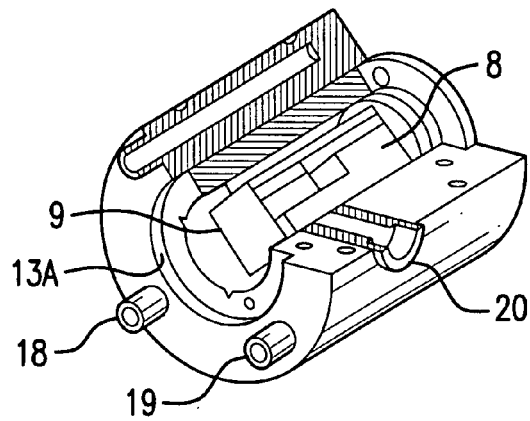
FIG. 2 is a partial cut-away of the Pockels cell with cooling body in accordance with FIG. 1, in the assembled condition.
Figure 3:
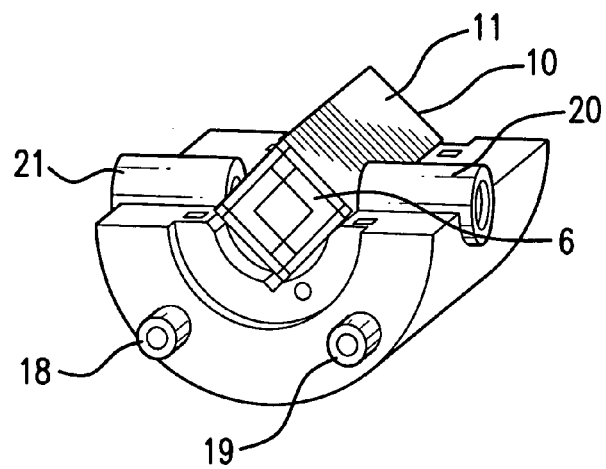
FIG. 3 is a perspective rendering of the Pockels cell in accordance with FIG. 1, in a partially assembled condition.
Figure 4:
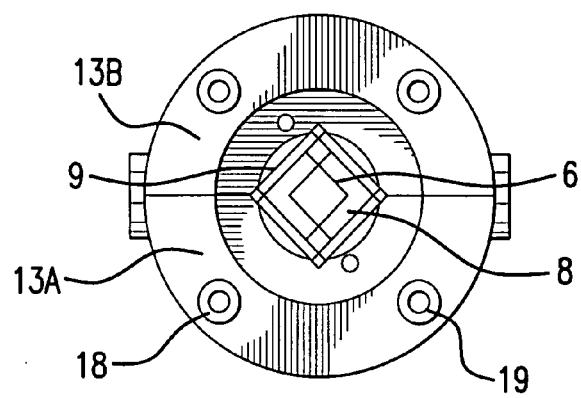
FIG. 4 is a front elevation the Pockels cell in accordance with FIG. 1.

The one of the two electrodes 8 is preferably embodied in one piece and point-symmetrical with respect to a point of symmetry 30 (FIG. 1b), which is rotated 90° to one another about the axis of symmetry 31 running parallel to the direction of radiation 5 through the point of symmetry 30. The other electrode 9 is embodied in two pieces such that the point of symmetry 30 is spaced equidistant from the two individual parts 30a, 30b and axes of symmetry define two points of symmetry 8 and 9, if any.

Provided around the exterior sides of the electrodes are flexible, electrically insulating, high voltage-proof mats 10 that conduct heat well and that are made of plastic or rubber. These mats 10 are affixed via a double-sided adhesive tape 11, which is embodied electrically insulating and to conduct heat well, to the interior side 12 of a cooling body, labeled 13A, 13B overall, and therefore are situated securely against this interior side 12. The cooling body is embodied from two half shells 13A, 13B that can be joined securely to one another at their separation surface 15 while leaving free the receiving region 14 for the two crystals 6, 7 surrounded with the plastic mats 10.

The receiving region 14 of each half shell 13A, 13B has two planar support surfaces 16, 17 that are at a right angle to one another and that extend parallel to the direction of radiation 5, of which support surfaces the one faces one electrode and the other faces an electrode-free surface of each crystal.

Each cooling body 13A, 13B has cooling channels 18, 19 that run parallel to the direction of radiation 5, that each have a channel axis, that have the same diameter, that are the same distance from the separation surface 15 and that are twice that distance from one another. A coolant flows through the cooling channels. The channel axis of each cooling channel 18, 19 of the two cooling bodies 13A and 13B run parallel to one another. Furthermore, the distance between each channel axis of the cooling channels 18, 19 and the associated support surface 16, 17 is the same.

Both cooling bodies comprise copper, whereby both half shells are embodied identically and form the cooling body 13 that is largely column-shaped in the exemplary embodiment illustrated. Due to the symmetrical design of the cooling channels 18, 19 of the two half shells 13A, 13B of the cooling body 13 with its support surfaces 16, 17, a uniform cooling effect is possible on the Pockels cell arranged in the interior side 12 of the cooling body.

Furthermore, each half shell 13A, 13B of the cooling body 13 is provided with a connector 20, 21 for each of the two electrodes. Each connector is embodied as a sleeve-like part and is oriented parallel to its separating surface 15 such that the one half of the sleeve is arranged in the one half shell and the other half of the sleeve is arranged in the other half shell of the cooling body. In addition, the electrical connector is advantageously arranged in the region of the free space between the two crystals that are arranged spaced from one another. By arranging the crystals 6, 7 of the Pockels cell in the two half shells 13A, 13B of the cooling body and by designing it with cooling channels and electrical connectors for the electrodes 8, 9 of the Pockels cell, uniform cooling and thus the greatest possible gradient-free temperature distribution is possible. Consequently very high efficiency is possible with thermal compensation of the two crystals. At the same time these are kept particularly low in distortion, which both prevents damage and also does not permit mechanical stresses in the crystal that have a negative effect on thermal compensation.

The invention claimed is:

1. Pockels cell with two successive parallelepiped RTP crystals (6, 7) that are oriented in the direction of radiation (5) for thermal compensation to one another, that are arranged spaced from one another, and that have a rectangular cross-section, of which each is provided with electrodes (8, 9) on two opposing surfaces, whereby said surfaces of said one crystal are rotated by 90° to those of said other crystal with respect to said direction of radiation (5), characterized in that the exterior sides of said electrodes (8, 9) are provided with flexible, electrically insulating, high voltage-proof plastic mats (10) that conduct heat well and in that these are adjacent to the interior side (12) of a cooling body (13A, 13B).

2. Pockels cell in accordance with claim 1, characterized in that said cooling body (13A, 13b) comprises two half shells that can be joined securely to one another at their separation surface (15) while leaving free the receiving region (14) for said two crystals (6, 7) surrounded with said plastic mats (10).

3. Pockels cell in accordance with claim 1 or 2, characterized in that said receiving region (14) of each half shell has two planar support surfaces (16, 17) that are at a right angle to one another and that extend parallel to said direction of radiation (5), of which said one faces one electrode and said other faces an electrode-free surface of said crystal.

4. Pockels cell in accordance with any of claims 1 through 3, characterized in that said cooling body is provided with cooling channels that run parallel to said direction of radiation, that each have a channel axis, that have the same diameter, that are the same distance from said separation surface, and that are twice that distance from one another, for a coolant.

5. Pockels cell in accordance with claim 4, characterized in that each half shell of said cooling body is provided with two cooling channels.

6. Pockels cell in accordance with claim 5, characterized in that said channel axis of each associated cooling channel is arranged equidistant in the mid-perpendicular plane formed by all mid-perpendiculars of each support surface.

7. Pockels cell in accordance with any of claims 1 through 6, characterized in that cooling channels that are adjacent to one another are embodied for the coolant to flow in opposing directions.

8. Pockels cell in accordance with any of claims 1 through 7, characterized in that said cooling body contains copper.

9. Pockels cell in accordance with any of claims 1 through 8, characterized in that both half shells are embodied identically, preferably form said cooling body that is column-shaped overall.

10. Pockels cell in accordance with claim 1, characterized in that said plastic mat contacts said electrode preferably by means of an adhesive that conducts heat well.

11. Pockels cell in accordance with claim 1 or 10, characterized in that said plastic mat contacts said support surface of said cooling body preferably by affixing using adhesive.

12. Pockels cell in accordance with claim 11, characterized in that said plastic mat is affixed to said support surfaces of said cooling body by means of a double-sided electrically insulating, and electrically high voltage-proof adhesive tape that conducts heat well.

13. Pockels cell in accordance with any of claims 1 through 12, characterized in that said plastic mats are also adjacent to the electrode-free sides of said crystal.

14. Pockels cell in accordance with claim 1, characterized in that two electrodes are provided for said two crystals.

15. Pockels cell in accordance with claim 14, characterized in that said two electrodes are embodied identical.

16. Pockels cell in accordance with claim 15, characterized in that said electrodes are formed from an angle section of an electrical conductor, preferably made of a metal.

17. Pockels cell in accordance with claim 16, characterized in that each of said two electrodes comprises two parts that are point-symmetrical with respect to a point of symmetry and that are rotated 90° relative to one another about said axis of symmetry running parallel to said direction of radiation through said point of symmetry.

18. Pockels cell in accordance with claim 17, characterized in that the electrical connector for said two electrodes is insulated by each half-shell and passes through parallel to its separation surface.

19. Pockels cell in accordance with claim 18, characterized in that said electrical connector is arranged in the region of the free space between said two crystals.

20. Pockels cell in accordance with claim 19, characterized in that in said column-shaped cooling body with respect to its plane of symmetry running parallel to the bottom side and the top side arranged parallel thereto said crystals are arranged in mirror symmetry and as required rotated 90° to one another.

* * * * *